F. L. BRADBURY.
CRULLER COOKING.
APPLICATION FILED NOV. 7, 1917.
1,266,912.
Patented May 21, 1918.
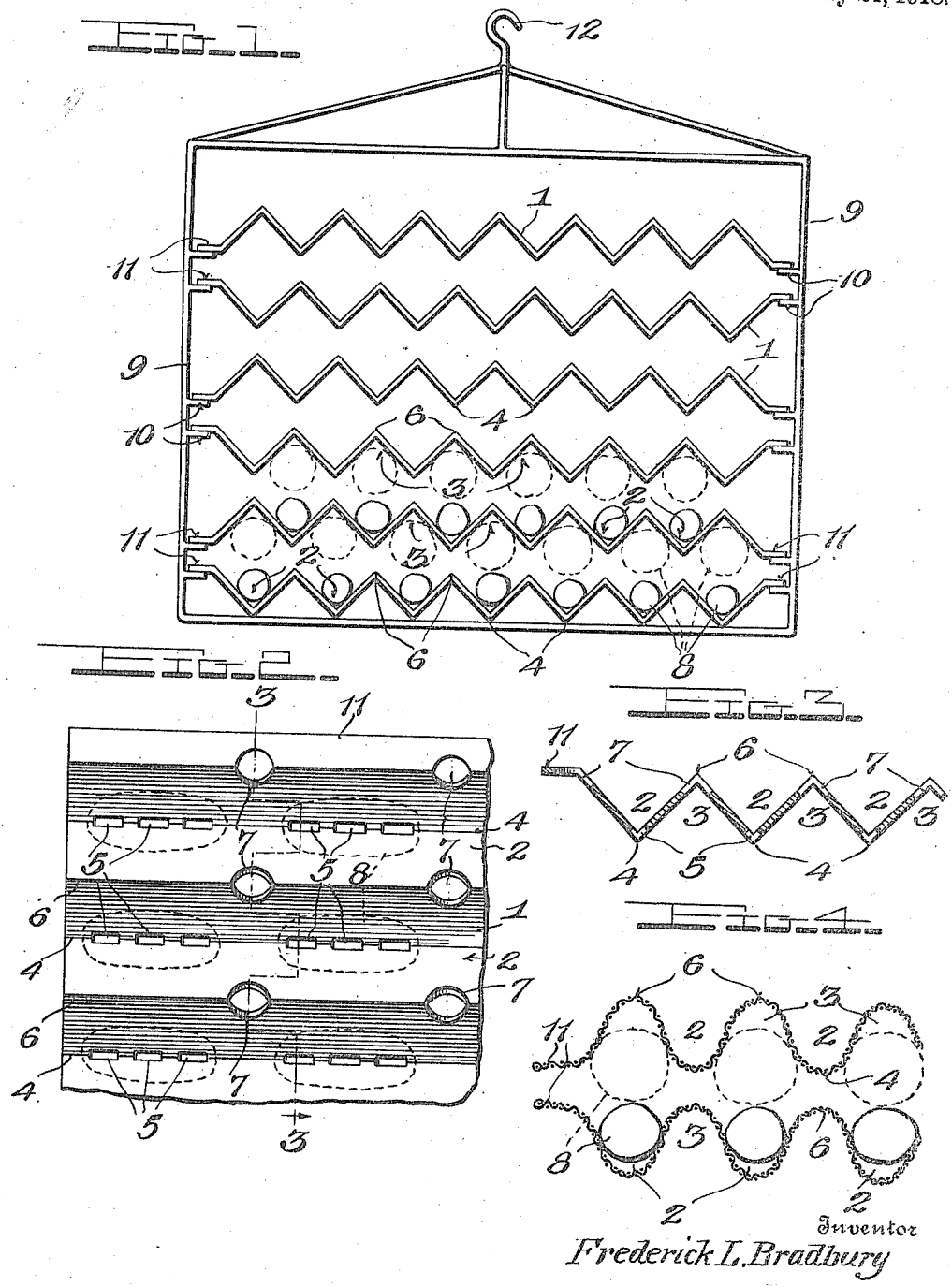
Inventor
Frederick L. Bradbury
By
Attorney

UNITED STATES PATENT OFFICE.

FREDERICK L. BRADBURY, OF BRIDGEPORT, CONNECTICUT, ASSIGNOR TO THE F. L. BRADBURY CO., OF BRIDGEPORT, CONNECTICUT, A CORPORATION OF CONNECTICUT.

CRULLER-COOKING.

1,266,912.   Specification of Letters Patent.   Patented May 21, 1918.

Application filed November 7, 1917. Serial No. 200,842.

*To all whom it may concern:*

Be it known that I, FREDERICK L. BRADBURY, a citizen of the United States, residing at Bridgeport, Fairfield county, Connecticut, have invented certain new and useful Improvements in Cruller-Cooking; and I do declare the following to be a full, clear, and exact description of the invention, such as will enable others skilled in the art to which it appertains to make and use the same.

This invention relates to certain new and useful improvements in a cruller cooker and it has for its primary object to provide an improved tray structure for supporting the crullers for immersion in the bath of liquid lard or grease.

The invention consists in a plurality of superposed and corrugated trays so arranged that the upper apices of a lower tray oppose the lower apices of the next upper tray whereby the grooves, which oppose each other, will compose a cruller-receiving chamber in the lower half of which the cruller dough is initially disposed.

The invention further comprises a corrugated or grooved tray perforated longitudinally to facilitate the lowering of the tray into the grease and also to secure complete circulation of the frying grease about the crullers.

Other objects will appear as the description progresses, and those features of construction and the arrangements and combinations of parts on which protection is desired will hereinafter be described in detail and claimed in a succinct manner, reference being made to accompanying drawing wherein—

Figure 1 is a view illustrating a plurality of cruller-supporting trays arranged in a container;

Fig. 2 is a fragmentary top plan view of a tray showing the preferred form of the invention;

Fig. 3 is a transverse section on line 3—3 of Fig. 2; and

Fig. 4 shows a modification of the tray.

Referring more in detail to the drawing, the tray 1 is here shown as constructed of corrugated material providing alternate upright and inverted channels 2 and 3, which channels may be V-shaped, as depicted in Figs. 1 and 3, or U-shaped as disclosed in Fig. 4.

To facilitate the lowering of the trays into the hot lard or grease and permit circulation of the latter about the crullers the bottoms or apices 4 of the V-shaped grooves 2 are provided with spaced series of slots or openings 5 and the apices 6 of the inverted V-grooves 3 provided with comparatively large, single openings 7 in preferably staggered relation to the series of slots 5.

The crullers are elongated in shape, as indicated by the dotted lines 8 in Fig. 2, and are slightly greater in length than a series of slots 5.

The arrangement and association of the trays is a very important part of this invention, a simple showing being found in Fig. 1 wherein 9 designates an open or skeleton frame which is provided with correlated pairs of ledges or guides 10 on its sides for the support of the cruller trays 1. The trays are formed with marginal flanges 11 for support on the guides 10, the alternate trays being inverted. This arrangement brings the apices 4 of an upper tray in direct opposing relation to the apices 6 of the next underlying tray, the intervening spacing being sufficiently small to prevent the passage of a cruller from one chamber composed of the opposing grooves 2 and 3, into the adjacent chamber. Consequently, the adjacent rows of crullers are relatively staggered.

In practice, the cruller dough is formed into bodies of proper length and are then deposited in the bottoms of the grooves 2 over the plurality of series of slots 5. The trays are then assembled in the frame 9 and, by means of a crane and suspending cable, or the like, engaged in the hook 12, said frame and its contained trays are lowered into the hot grease. During such lowering, the grease will pass through the slots 5 and openings 7 and thereby permit the trays to more easily immerse. Further, each cruller will rise from the lower half 2 of its chamber to the upper half 3, their escape to the adjacent chamber being guarded against by the proper spacing of the trays. In this connection it will be noted that the crullers are supported at widely spaced points while being cooked in their diamond-shaped chambers, or at points on the side walls of the grooves whereby the flattening or disfiguration of the product is reduced to a minimum and the cooking more readily accomplished, for frequently, when a cruller is supported on a flat tray, it will accordingly assume a broad flat contact to the exclusion of the grease with the resulting soggy and ill-cooked product.

As heretofore mentioned the grooves may be U-shaped without deviating from the spirit of the invention, a two-point support for the cooking cruller being maintained also in this form of the invention. While the trays are preferably constructed from sheet metal, they may also be formed of wire mesh or like foraminous material, as depicted in Fig. 4. In either form the grease will readily circulate and aid in freeing the dough from the grooves 2 should they have adhered thereto.

Obviously, other shapes of grooves and changes in design and construction may be resorted to without departing from the spirit of the invention.

What is claimed is:

1. In a cruller cooker, an open frame having opposing supporting guides, and a plurality of trays supported on said guides, each tray comprising a corrugated body forming upright and inverted V-shaped grooves, the apices of the upright grooves having spaced series of openings and the apices of the inverted grooves having openings staggered relative to the spaced series of openings, the inverted grooves of one tray opposing the upright grooves of the next lower tray to compose therewith chambers for the crullers, and said trays being in such proximity to each other as to prevent the passage of a cruller from one chamber to the adjacent chamber.

2. In a cruller cooker, a containing frame having spaced opposing supporting guides, a plurality of trays removably supported on said guides, each tray comprising a series of upright and inverted substantially V-shaped portions, the trays being alternately disposed to oppose the V-shaped portions of one tray to the corresponding portions of an adjacent tray whereby elongated composite cruller cooking chambers are formed.

3. In a cruller cooker, an open frame having opposing supporting guides, and a plurality of trays supported on said guides, each tray comprising a corrugated body forming upright and inverted V-shaped grooves, the apices of the upright grooves having spaced series of openings and the apices of the inverted grooves having openings staggered relative to the spaced series of openings, the inverted grooves of one tray opposing the upright grooves of the next lower tray to compose therewith chambers for the crullers, and marginal flanges on the tray for supporting the same from the guides.

4. In a cruller cooker, an open frame having opposing supporting guides, and a plurality of trays supported on said guides, each tray comprising a corrugated body forming upright and inverted grooves, the apices of the grooves being perforated, and marginal flanges on the trays for supporting the latter on the guides.

In testimony whereof I affix my signature in presence of two witnesses.

FREDERICK L. BRADBURY.

Witnesses:
RUTH C. WILLIAMS,
M. H. CAPERS.

Copies of this patent may be obtained for five cents each, by addressing the "Commissioner of Patents, Washington, D. C."